(12) United States Patent
Dobbins

(10) Patent No.: US 8,458,064 B1
(45) Date of Patent: Jun. 4, 2013

(54) SYSTEM AND METHOD FOR TRANSFERRING ELECTRONIC ACCOUNT INFORMATION

(75) Inventor: Michael P Dobbins, Frisco, TX (US)

(73) Assignee: Capital One Financial Corporation, McLean, VA (US)

( * ) Notice: Subject to any disclaimer, the term of this patent is extended or adjusted under 35 U.S.C. 154(b) by 757 days.

(21) Appl. No.: 11/625,972

(22) Filed: Jan. 23, 2007

Related U.S. Application Data

(60) Provisional application No. 60/763,628, filed on Jan. 30, 2006.

(51) Int. Cl.
*G06Q 40/00* (2012.01)
(52) U.S. Cl.
CPC ................................. *G06Q 40/00* (2013.01)
USPC .............................................. 705/35; 705/39
(58) Field of Classification Search
CPC ......................................................... G06Q 40/00
USPC .................................................. 705/40, 35, 39
See application file for complete search history.

(56) References Cited

U.S. PATENT DOCUMENTS

| | | | |
|---|---|---|---|
| 5,175,416 A | 12/1992 | Mansvelt et al. | |
| 5,825,003 A | 10/1998 | Jennings et al. | |
| 5,920,847 A * | 7/1999 | Kolling et al. | 705/40 |
| 5,937,396 A | 8/1999 | Konya | |
| 5,953,710 A * | 9/1999 | Fleming | 705/38 |
| RE36,788 E | 7/2000 | Mansvelt et al. | |
| 6,131,810 A * | 10/2000 | Weiss et al. | 235/379 |
| 6,873,972 B1 | 3/2005 | Marcial et al. | |
| 6,910,020 B2 | 6/2005 | Oyama et al. | |
| 7,222,093 B2 * | 5/2007 | Block et al. | 705/35 |
| 7,383,223 B1 * | 6/2008 | Dilip et al. | 705/39 |
| 7,406,445 B1 * | 7/2008 | Silverbrook et al. | 705/42 |
| 7,742,986 B2 * | 6/2010 | Steele et al. | 705/39 |
| 7,848,974 B1 * | 12/2010 | Sheehan | 705/35 |
| 2002/0029200 A1 | 3/2002 | Dulin et al. | |
| 2003/0217001 A1 * | 11/2003 | McQuaide et al. | 705/41 |
| 2003/0225688 A1 * | 12/2003 | Dobbins | 705/39 |
| 2003/0233333 A1 | 12/2003 | Lee et al. | |

(Continued)

FOREIGN PATENT DOCUMENTS

| | | |
|---|---|---|
| EP | 0 755 136 | 7/1996 |
| EP | 0 958 559 | 11/1997 |

(Continued)

OTHER PUBLICATIONS

John Cranage, Personal Finance: Customers are quick to quit for better deal, Oct. 27, 2001, Birmingham Post (UK), p. 28.*

(Continued)

*Primary Examiner* — Ella Colbert
*Assistant Examiner* — Scott S Trotter
(74) *Attorney, Agent, or Firm* — Hunton & Williams LLP

(57) ABSTRACT

Systems and methods enable transfer of electronic account information from a first account provider to a second account provider. Through a receiving account provider system, an interface is presented to the user, the interface comprising a display of one or more selectable accounts associated with a first account provider. The user then selects one or more accounts to transfer and then the receiving account provider system effects the transfer of information from that selected account or accounts to an account associated with the receiving account provider system.

34 Claims, 16 Drawing Sheets

U.S. PATENT DOCUMENTS

| | | | |
|---|---|---|---|
| 2004/0006540 A2 | 1/2004 | Paglin | |
| 2004/0030645 A1 | 2/2004 | Monaghan | |
| 2004/0162778 A1* | 8/2004 | Kramer et al. | 705/40 |
| 2005/0103838 A1* | 5/2005 | Slotkin et al. | 235/380 |

FOREIGN PATENT DOCUMENTS

| | | |
|---|---|---|
| JP | 2000-040116 | 2/2000 |
| JP | 2002-318902 | 10/2002 |
| JP | 2004-178259 | 6/2007 |
| WO | WO 01/24082 | 4/2001 |

OTHER PUBLICATIONS

Deborah Hargreaves, Changing bank accounts should become simpler, Nov. 17, 2001, Financial Times London (UK), p. 3.*

Nick Huber, Banks' three-year data transfer project due to roll out this month, Nov. 2, 2004, p. 16.*

Unknown, IEEE 100 The Authoritative Dictionary of IEEE Standards Terms, Dec. 2000, IEEE, Inc., unit definition.*

* cited by examiner

Switching Bill Payees

| Main Page | Manage Old Bank Accounts | Generate Letters | Schedule Alerts |

▶ Demo | ✉ Contact Us | ? Help

Select Payees for Switching

One of the most exciting features of Switching System is the ability to move your bill payees electronically. Select which payees you want to move to your new Online Banking profile.

| Account Information | Switch Bill Payees | Transfer Funds |

Texas National Bank ▼  [ Link Another Bank ]

| Bill Payees to Switch | Account Number |
|---|---|
| ☐ Comcast Cable | 0033221199887653 |
| ☑ NetFlix | 8377271200933892 |
| ☐ State Farm Insurance - Pontiac Grand Prix | 83929927744 |
| ✓ The Illuminating Company | 75661110092 |
| ☑ Washington Mutual Home Loans | 00012348483 |
| ☐ Switch All | |

[ Switch All Bill Payees ]

FIG. 3E

General Letters - Contact Setup

| Main Page | Manage Old Bank Accounts | Generate Letters | Schedule Alerts |

▶ Demo | ✉ Contact Us | ? Help

Enter Contacts to Switch

Switching System can help you create notification letter to those companies that automatically debit or credit your account. You should check with these companies to determine if they provide a faster method to notify them of an account change. Please provide some basic information below to help up complete the notification letters.

| Setup Senders | Contact List | Edit/Print Letters |

Contact Information

Company Name:

Account Number: (If applicable)

Company Address:

City:  State:  Zip:

Switch transaction from...

To this Capital One account...

Trasnaction posts as a...

Address Switch letters from...

[ Add Contact ]

| Add/Edit Contact | Contact List |

FIG. 3K

General Letters - Manage/Print Switch Letters

| Main Page | Manage Old Bank Accounts | Generate Letters | Schedule Alerts |

▶ Demo | ✉ Contact Us | ? Help

Print Letters

Send notification letters to the contacts listed below. You can send a "close account" letter to your old bank when you're ready.

| Setup Senders | Contact List | Edit/Print Letters |

| Print Letters to Contacts | From | Number of Copies to Print |
|---|---|---|
| ☑ AT&T Wireless | Michael Dobbins | |
| ☐ Cingular Wireless | Michael Dobbins | |
| ☑ Discover Card | Nikki Dobbins | |
| ☐ National City Auto Loan | Michael Dobbins | |
| ☐ University of Texas | Michael Dobbins | |
| ☐ Perkins Loan | Nikki Dobbins | |
| ☐ The Illuminating | Nikki Dobbins | |
| ☐ Company | Michael Dobbins | |
| ☐ Verizon Visa Card | Michael Dobbins | |
| ☐ Visa Platinum Card | Michael Dobbins | |

☐ Select All

[ Preview ]  [ Print Close Account Letter ]  [ Print Contact Letters ]

FIG. 3M

Schedule Alerts

| Main Page | Manage Old Bank Accounts | Generate Letters | Schedule Alerts |

▶ Demo | Contact Us | ? Help

Schedule Alerts

We can notify you by email or phone when your transactions begin posting to your accounts.

Schedule Alerts

Select Account: Family Checking...0987 $3,930.45 ▼

---

Contact Points  ☐ Notify me by Email  [_____]

☑ Notify me by Phone  555 - 012 - 9876

Alert Options

Alert me when my balance goes...  Above ▼  $ [____]

Alert me of the following transaction...  Auto Debit ▼  Above ▼  $ [____]

( Schedule Alerts )

---

| Alert | Contact Point | |
|---|---|---|
| Balance Alert: Above $1000 | mdobbins@capitalone.com | Edit  Delete |
| Transaction Alert: Auto Debit Below $100 | 555-012-9876 | Edit  Delete |

FIG. 3N

SYSTEM AND METHOD FOR TRANSFERRING ELECTRONIC ACCOUNT INFORMATION

PRIOR APPLICATION

This Application claims priority to U.S. Provisional Application No. 60/763,628 entitled "System and Method for Transferring Electronic Account Information," filed on Jan. 30, 2006, the entirely of which is hereby incorporated by reference.

TECHNICAL FIELD

This invention relates in general to transferring information between financial accounts. More particularly, in certain embodiments, the invention relates to transferring banking information, funds, and payment information from an electronic payment account at a first account provider to an electronic payment account at a second account provider

BACKGROUND

People maintain financial accounts for a variety of purposes. Financial accounts can include, for example, credit accounts, savings accounts, checking accounts, investment accounts, and the like. Certain accounts are commonly used to pay bills. Bills may be paid online. In certain situations, an online payment is made through a web interface available on a web site operated by the service provider that issues the invoice or bill. In other situations, a bank may provide an online payment system allowing customers to pay bills to a variety of services providers and/or merchandisers.

SUMMARY

Certain embodiments of the present invention are generally directed to systems and methods for switching electronic account information from a first account provider to a second account provider. For instance, the electronic accounts may be online bill payment accounts and the account providers may be banks. Among other things, the second account provider may provide a web site at which a customer may engage in electronic payment account transfer activities. The customer may access, through the site, an already-existing electronic payment account at a third-party provider. The web site may provide to the customer a listing of payees associated with the selected already-existing account. The payees may be service providers (e.g., a gas company, an electric company, a telephone company, a store, and a mortgage bank), which receive payments electronically through the already existing electronic payment account. The customer may select from among the various payees to designate those payees (possibly all payees) for which electronic payment information will be transferred. A communications link may be established between the first account provider and the new account provider and/or the customer. The customer may send authentication and verification information to the first account provider, through the web site interface, in order to establish access to the already-existing account. The system utilized by the new account provider then lifts the information from the first account provider (e.g., by screen scraping or other data extraction techniques) and downloads the information into a new electronic payment account for the customer at the new account provider.

According to one embodiment, systems and methods enable transfer of electronic account information from a first account provider to a second account provider. Through a receiving account provider system, an interface is presented to the user, the interface comprising a display of one or more selectable accounts associated with a first account provider. The user then selects one or more accounts to transfer and then the receiving account provider system effects the transfer of information from that selected account or accounts to an account associated with the receiving account provider system.

According to another embodiment, a system comprises a selection unit that enables a user to select one or more selectable electronic accounts associated with a first account provider and a transmission unit that transmits the selection to a system that accesses the electronic account and effects a transfer of data associated with the selected account to a second account provider.

According to another embodiment, a system comprises a transmission unit that transmits data to a user system that enables a user of the user system to select one or more one or more selectable accounts associated with a first account provider, a receiving unit that receives one or more account selections from the user system and a transfer processing unit that effect transfer of information associated with one or more of the one or more account selections to a second account associated with a second account provider.

According to one embodiment, a system is provided for establishing an electronic payment account. The system includes a processor and an electronic payment information transfer application executable by the processor. The system may also include a graphical user interface operable to present a user with one or more selectable electronic accounts associated with a first account provider and enable the user to select an electronic account, access the electronic account, and effect a transfer of data associated with the selected account to a second account provider.

According to another embodiment, a method is provided for establishing an electronic payment account. One step includes presenting, through a second account provider system, a graphical user interface to a user. The interface includes a display of one or more selectable accounts associated with a first account provider. Another step includes enabling the user, through the graphical user interface, to select one or more of the accounts. Another step includes enabling the user, through the graphical user interface, to effect transfer of information associated with a selected account to a new account at the second account provider.

Certain embodiments may benefit from certain advantages. It should be noted that any particular embodiment may provide some, none, or all of the listed advantages.

One advantage is that the process of switching between electronic account providers may be automated. This enables a customer to make the switch without having to completely repeat the process used in establishing the first account. The switch may be made through the use of computers and software applications. This speeds the process of establishing the second online payment account and deactivation of the first electronic payment account.

Another advantage of the automated nature of the transfer of information between the first system and the second system is that errors are reduced with respect to the establishment of information in the second system. For example, service provider account numbers may be automatically transferred. This reduces the chance that the account numbers will be entered (e.g., manually by keyboard) incorrectly in the second system.

Another advantage is that payment activity is not disrupted. Due to the ease and speed by which the electronic payment service may be switched, the time to terminate one electronic payment account and establish a second electronic payment account is greatly reduced. Thus, bills may continue to be paid to the correct entities without disruption or delay, which, in turn, can cause late payment issues.

Another advantage is that an electronic payment account may be created and data fields may be populated without having to re-enter the data. This saves time and reduces errors.

Other advantages will be apparent from a review of the detailed description, the drawings and the appended claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION

Certain embodiments of the invention are generally directed to systems and methods for switching electronic account information from a first account provider to a second account provider. Among other things, the second provider may provide a graphical user interface (e.g., at a web site) through which a customer may engage in electronic account transfer activities. For example, the customer may access, through the graphical user interface, an already-existing first electronic payment account at the first account provider. The graphical user interface may provide to the customer a listing of electronic payees associated with the selected already-existing account. The payees may be service providers (e.g., a gas company, an electric company, a telephone company, a store, and a mortgage bank), which receive payments electronically through the already existing account. The customer may select from among the various payees to designate those payees (possibly all payees) for which electronic payment information will be transferred from the selected first account to a new second account (e.g., at the second account provider). The system utilized by the new account provider then lifts the information from the first account (e.g., by screen scraping or other data extraction techniques) and downloads the information into a new electronic account for the customer at the second account provider. This new electronic account may provide view-only of balances, transaction history, and the ability to transfer money to and from the account and may not serviced by the bank beyond these features.

Figure 1:
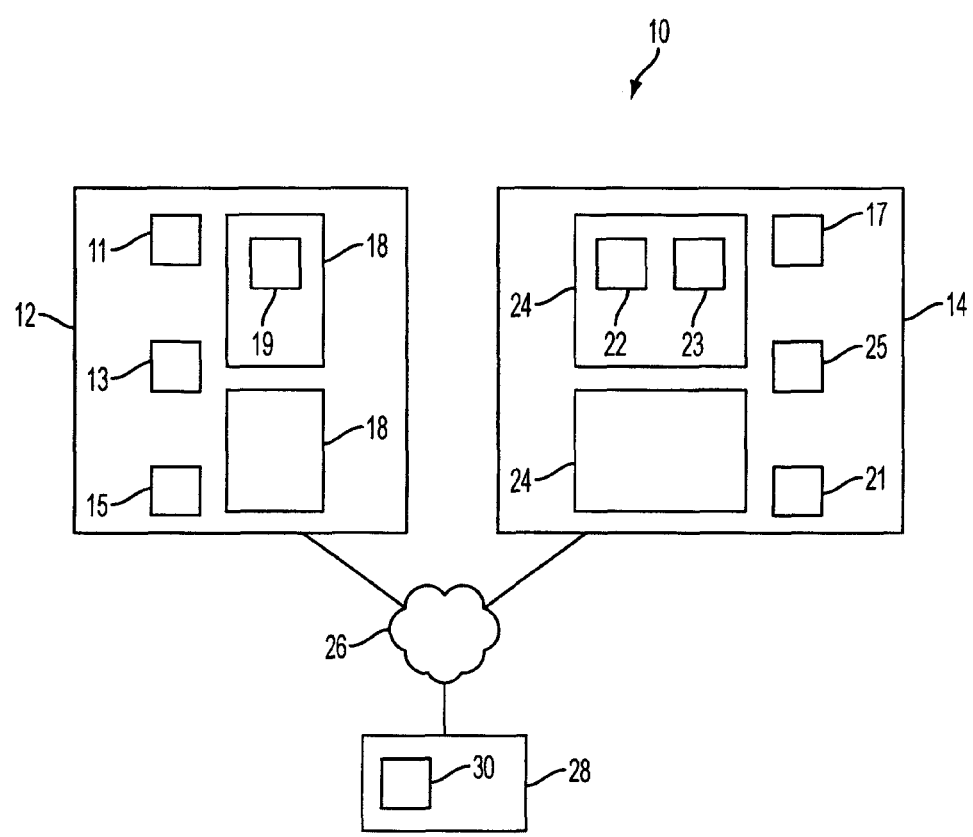
FIG. 1 illustrates an example system for enabling the transfer of information from a first electronic payment account to a second electronic payment account in accordance with an embodiment of the invention.

Example embodiments of the present invention and their advantages are best understood by referring now to FIGS. 1, 2, and 3A-3N of the drawings, in which like numerals refer to like parts. FIG. 1 illustrates an example system 10 of a first account provider 12 and a second account provider 14. System 10 may include additional account providers (not shown). "Account provider" is meant to include any entity that may provide electronic payment functionality, such as online bill payment services. Thus, "account provider" may include entities such as banks, credit issuers, investment companies, online bill payment providers, etc. Merchants (and any other entity that provides goods or services in exchange for payment) are also included to the extent they provide the ability for customers to electronically pay funds from an account to one or more payees. In the example embodiment, first and second account providers 12 and 14 are banks. The term "accounts" includes any account from which payments may be made. Examples include, credit accounts, savings accounts, investment accounts, checking accounts, and any other deposit accounts.

According to the illustrated embodiment, first account provider 12 may include one or more operator terminals 11, a data management system 13, a network interface 15, and one or more function modules 18. Data management system 13 may include one or more processors and one or more databases for enabling one or more applications to be performed by the function modules 18. The components of first provider 12 may be located at one or more sites and may be coupled to each other using one or more links, each of which may include some or all of a computer bus, local area networks (LANs), metropolitan area networks (MANs), wide area networks (WANs), portions of the Internet, a public switched telephone network (PSTN), any other appropriate wireline, optical, wireless, or other suitable communication link, or any combination of the preceding.

An operator terminal 11 may provide an operator with access to data management system 13 to configure, manage, or otherwise interact with data management system 13. An operator terminal 11 may include a computer system. As used in this document, the term "computer" refers to any suitable device operable to accept input, process the input according to predefined rules, and produce output, for example, a personal computer, workstation, network computer, wireless data port, wireless telephone, personal digital assistant, one or more processors within these or other devices, or any other suitable processing device.

Data management system 13 may store various data and/or files regarding financial accounts maintained by first provider 12, such as the parameters, the relevant entities, the balance, and the account status of each account, for example. Data management system 13 may manage data associated with accounts stored in an account database, which may in particular embodiments include creating, modifying, and deleting data files associated with accounts automatically or in response to data received from the one or more operator terminals 11 function modules 18, the accounts themselves, and/or the account holders. These activities may specifically include querying a balance, automatically transferring funds, extending credit, changing account parameters such as an interest rate, etc. Additionally, data management system 13 may call the one or more function modules 18 to provide particular functionality according to particular needs, as described more fully below. Data management system 13 may include one or more data processing units, one or more memory units, one or more web servers, and any other suitable components for managing data associated with accounts, The components of data management system 13 may be supported by one or more computer systems at one or more sites. One or more components of data management system 13 may be separate from other components of data management system 13, and one or more suitable components of data management system 13 may, where appropriate, be incorporated into one or more other suitable components of data management system 13.

The one or more data processing units may process data associated with the accounts, which may include executing coded instructions that may in particular embodiments be associated with the one or more function modules 18. The one or more memory units may be coupled to the data processing unit(s) and may include one or more suitable memory devices, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), microcontrollers, or microprocessors. The memory unit(s) may be separate from or partially or completely integrated with an account database.

A network interface 15 may provide an interface between data management system 13 and a communications network 26 such that data management system 13 may communicate with account holders, such as customer 28, and with other financial service providers, such as second financial service provider 14.

A function module 18 may provide particular functionality associated with handling accounts or handling transactions in which money is transferred between accounts. As an example only and not by way of limitation, a function module 18 may provide functionality associated with establishing and managing accounts, risk profiling, and records management. A function module 18 may be called by data management system 13, for example, as a result of data received from an operator terminal 11, an account, or an account holder. This data may be received via communications network 26. In response, the function module 18 may provide the particular functionality associated with the function module 18 and communicate one or more results to a data processing unit or one or more other suitable components of data management system 13. The communicated results may be used to create, modify, or delete one or more data files associated with one or more accounts, provide data to an operator at an operator terminal 11, or perform any other suitable task. It should be understood that data being transmitted over communications network 26 or among any of the components of system 10 (e.g., electronic payment information) may be transmitted via any suitable method including telephonically, digitally, by way of a voice recognition unit (VRU), orally, etc.

Function modules 18 are operable to perform various functions in the operation of the system 10. According to one embodiment, a function module 18 includes an electronic payment application 19. Application 19 allows a customer to pay for an invoice electronically. For example, application 19 may provide online payment functionality to allow the customer to access application 19 online via the Internet and use application 19 to pay a variety of bills. In some configurations, the customer accesses an electronic payment function provided by a service provider that has also issued the invoice. In this embodiment, the customer accesses the electronic payment function to pay bills to a single debtor, merchant, service provider etc. The customer may be able to pay multiple bills, but only those issued by the provider. For example, if the service provider is an electric utility company, the customer may be able to access the company's electronic payment function to pay multiple electric bills all issued by the same company. In other configurations, the electronic payment application is provided by a third party, such as a bank, other financial institution, or electronic payment application provider. For example, a bank may make an electronic payment application available to its customers to enable them to pay a variety of bills issued by a variety of merchants, services providers, other financial institutions, etc.

In at least one embodiment, the electronic payment application is provided in the form of an online bill payment system. Preferably, the online bill payment function is provided by way of a graphical user interface (GUI), which provides an interface by which the customer may make various selections in order to accomplish invoice payment. For example, the online payment GUI may provide the customer to select from a plurality of bill payment recipients. In the case of a single provider, this may be predetermined. In the case of other online payment scenarios (as discussed above), however, the customer may be able to select from among a variety of merchants, service providers, etc (invoice or bill issuing entities), in order to make payments on invoices from the respective entities. The GUI may also allow the customer to provide certain payment information, such as account numbers, codes, expiration dates, customer identity codes, merchant identity codes, or other information, addresses, telephone numbers, etc. The GUI may also enable the customer to select a payment amount. The GUI may also enable the customer to select from various invoices or bills. The GUI may also enable the customer to select from various accounts within a given account provider. For example, if an account provider is a bank, the GUI may allow the user to select from among a primary checking account, a secondary checking account, a credit line account and a savings account. The GUI may also allow the customer to provide a payment execution date, which may be different (for instance) from the date on which the customer is providing the information. The GUI preferably allows these and other functions which may be associated with an electronic and/or online payment service.

Like data management system 13, function modules 18 may be physically distributed such that each function module 18 or multiple instances of each function module 18 may be located in a different physical location geographically remote from each other, from data management system 13, or both. In addition, each function module 18 may be partially or completely integrated with other function modules 18 and/or with other components of first provider 12. For example, particular function modules 18 may include operator terminals 11 such that at least a portion of the functionality of such function modules 18 is provided by human operators. Thus it should be understood that the functionality provided by each of function modules 18 may be completely automated, partially automated, or completely human-controlled.

FIG. 1 also illustrates a second account provider 14. Similar to first account provider 12, second account provider 14 has one or more operator terminals 17, a data management system 25, and a network interface 21. Network interface 21 allows electronic communications among the components of second provider 14 and with the other elements of system 10, via communications network 26. Second provider also includes one or more function modules 24. Functions modules 24 provide functionality for second provider 14 similar to that provided by function modules 18 for first provider 12. One of the function modules 24 includes an electronic payment application 22 similar to that described above in connection with first account provider 12.

This particular function module (or another function module or component of second provider 14) includes an electronic payment information transfer application 23. Application 23 enables the transfer of information from first electronic payment application 19 to second electronic payment application 22. Among other things, in certain embodiments, this transfer allows a customer 28 to terminate first payment application 19 and automatically establish second payment application 22. This may be accomplished simultaneously or nearly simultaneously.

Preferably, transfer application 23 automatically lifts the information and data from first payment application 19 and deposits the information in the appropriate data fields, records, etc. necessary to establish the electronic payment functionality of second payment application 22. For example, customer 28 may have an electronic payment account with first payment provider 12, which allows customer 28 to pay bills online (e.g., using computer 30 connected to the Internet). The payment account may have a variety of merchants which are either predetermined or customized by customer 28. For each merchant, invoice information may be periodically loaded into a payment due field within the electronic payment application. This information may be provided, for example, from the merchant to the provider 12 by way of an electronic communication at the customer's request. For instance, the customer may provide financial institution information (such as routing and account numbers) to the merchant and may otherwise request the merchant to establish a relationship first provider 12 in order to electronically receive payments from provider 12 using an account owned by customer 28. For each merchant included in the electronic payment account, there may be other information available on a permanent, temporary, or periodic basis. For example, the customer may be able to specify a payment date as the date on which the payment to the particular merchant will be made. The customer may specify a payment amount, an account from which a payment will be made, and other parameters associated with electronic payments such as whether a payment is a one-time payment or a periodic payment. Other parameters of electronic payment systems are envisioned and included within the scope and spirit of the disclosure.

The transfer of information from one electronic payment system to another may be accomplished, for example, by the use of a data extraction application. The term "data extraction application" is meant to encompass any technique by which data may be identified and removed from a medium. Other terms that may be used include, without limitation, screen scraping, web scraping, data scraping, page scraping, and HTML (Hypertext Markup Language) scraping. Accordingly, according to an example embodiment, the data extraction application is operable to capture data from a system or program by capturing and interpreting the contents of an associated display that is not actually intended for data transport or inspection by programs. Data extraction, in certain scenarios, can refer to parsing HTML in web pages with computer programs designed to find particular patterns or parts of content. Screen scraping may be accomplished, for example, by the use of regular expressions or computer languages that have strong support for regular expressions.

Preferably, the data extraction tool also includes, or is accompanied by, a data insertion tool operable to take the data extracted from the first payment system and insert it into the appropriate locations within the second payment system. Alternatively, the transfer application may simply copy the first payment system application along with the data for the particular customer wanting the transfer and duplicate the entire package of information within the system of the second provider.

In at least one embodiment, electronic payment information transfer application 23 provides a graphical user interface (GUI) accessible by customer 28. The GUI may provide customer 28 with the ability to perform certain electronic payment account transfer activities. As an example, the GUI may present various computer screen configurations to the customer 28 to allow the customer to engage in such activities. One example screen presented to the customer is provided as FIG. 3A. This screen includes various options for the customer. Included in the options are managing accounts, generating letters, and scheduling alerts. Managing accounts can include any account information transfer activity such as extracting and transferring payee and payment information from one account to another and transferring funds between accounts. Generating letters can include any automated generation of notices, which may be sent to payees, old account providers, new account providers, or any additional recipients that might be associated with or impacted by the account information transfer activity. Scheduling alerts can include any action by which an alert is established for a particular occurrence in connection with an account information transfer activity. An alert is not necessarily established in connection with a transfer activity and may related to other activity. Alert parameters may be set by the user and can include amounts, dates, number of instances of an event, event type, credits and debits to accounts, access of accounts, transfer of account information, and the like. Alerts can be scheduled to occur when money is transferred, account information is transferred, an old account is closed, a new account is opened, a payee is either added or removed from the electronic payment account, a particular time period has passed, a date occurs, etc.

Figure 3A:
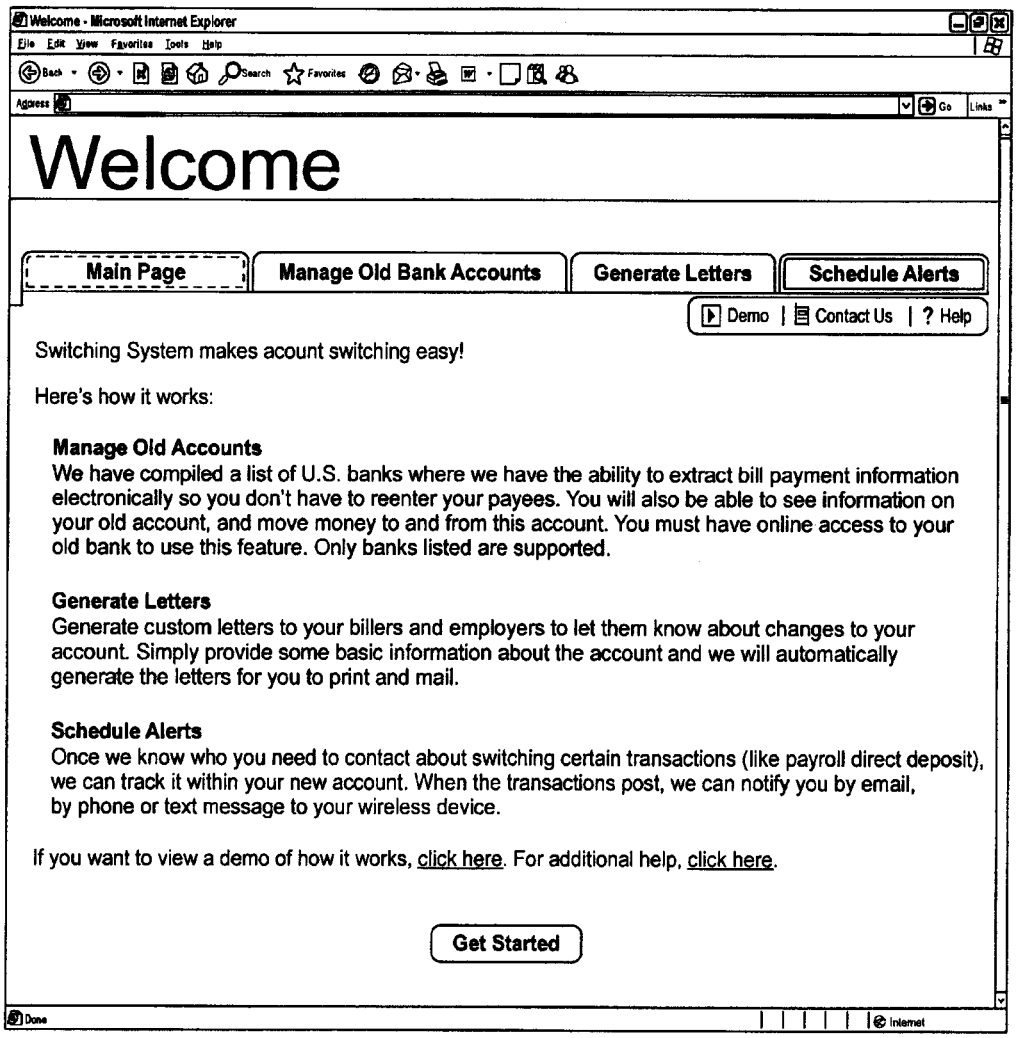
FIGS. 3A-3N illustrate example screen shots of a graphical user interface which may be associated with various electronic account information transfer techniques according to an embodiment of the invention.
Figure 3B:
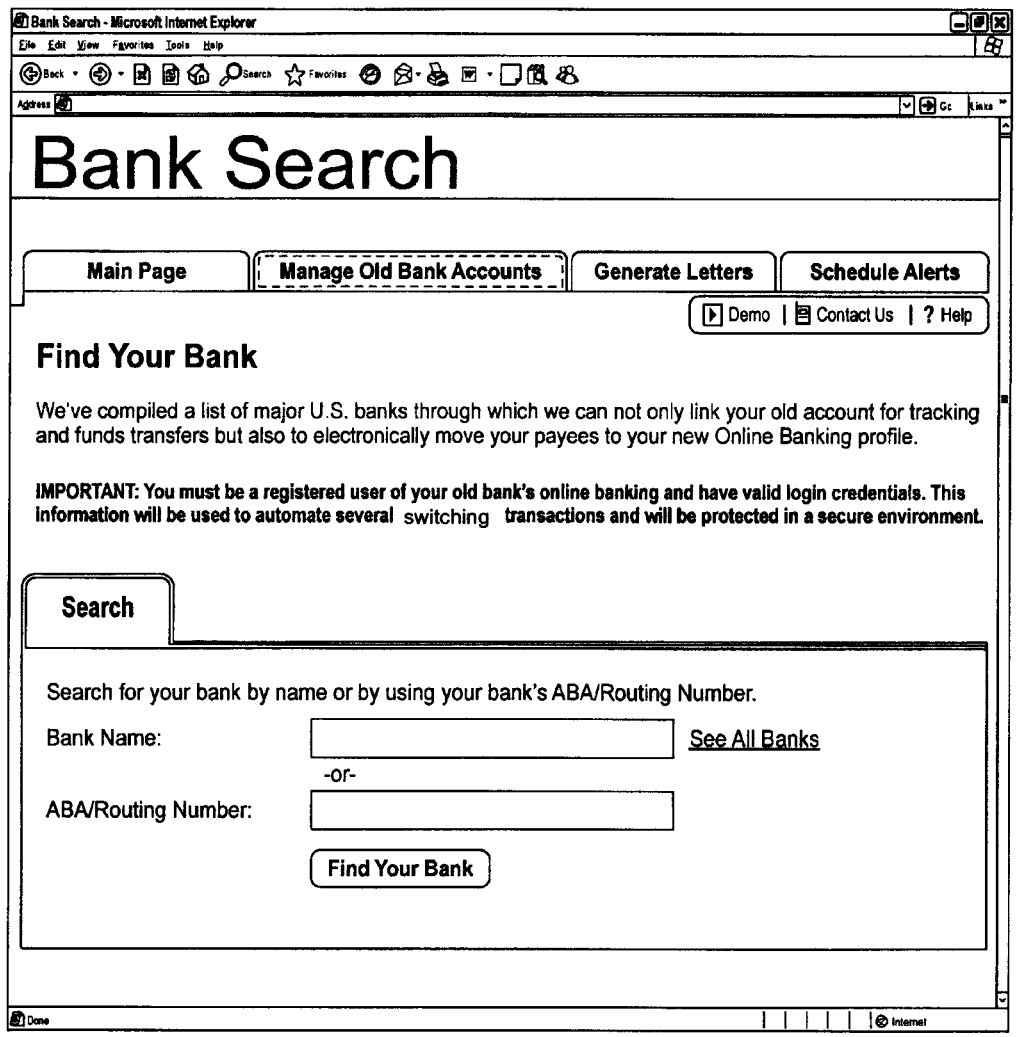

Another example screen is provided as FIG. 3B. This screen provides an environment in which a user can search for account providers (e.g., financial institutions) which are linked to the system providing the account transfer capability. As illustrated, a user may search for linked account providers by an identifier. For example, the identifier may be a name or a routing number. Other identifiers are possible including addresses, phone numbers, contact names, codes, etc.

Figure 3C:
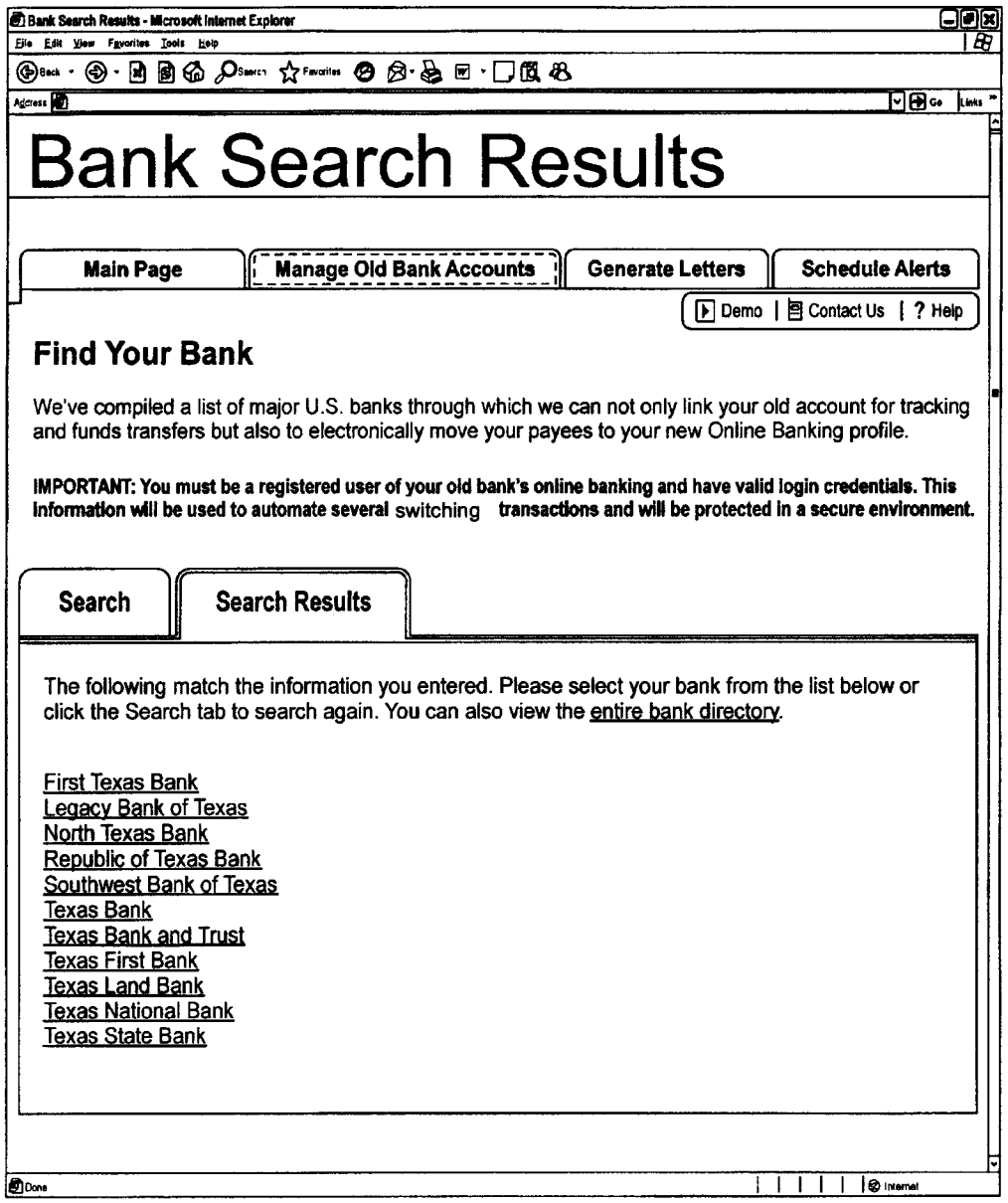

Another example screen is provided as FIG. 3C. This screen is a continuation of the screen illustrated in FIG. 3B. This screen presents search results by way of a listing of the account providers that meet the specified search criteria. Alternatively, a listing of all linked account providers may be presented, allowing the user to select from among all linked providers. At this screen the user may select an account provider in order to view the user's accounts which are maintained by the selected account provider. Multiple account providers may be selected by the user.

Figure 3D:
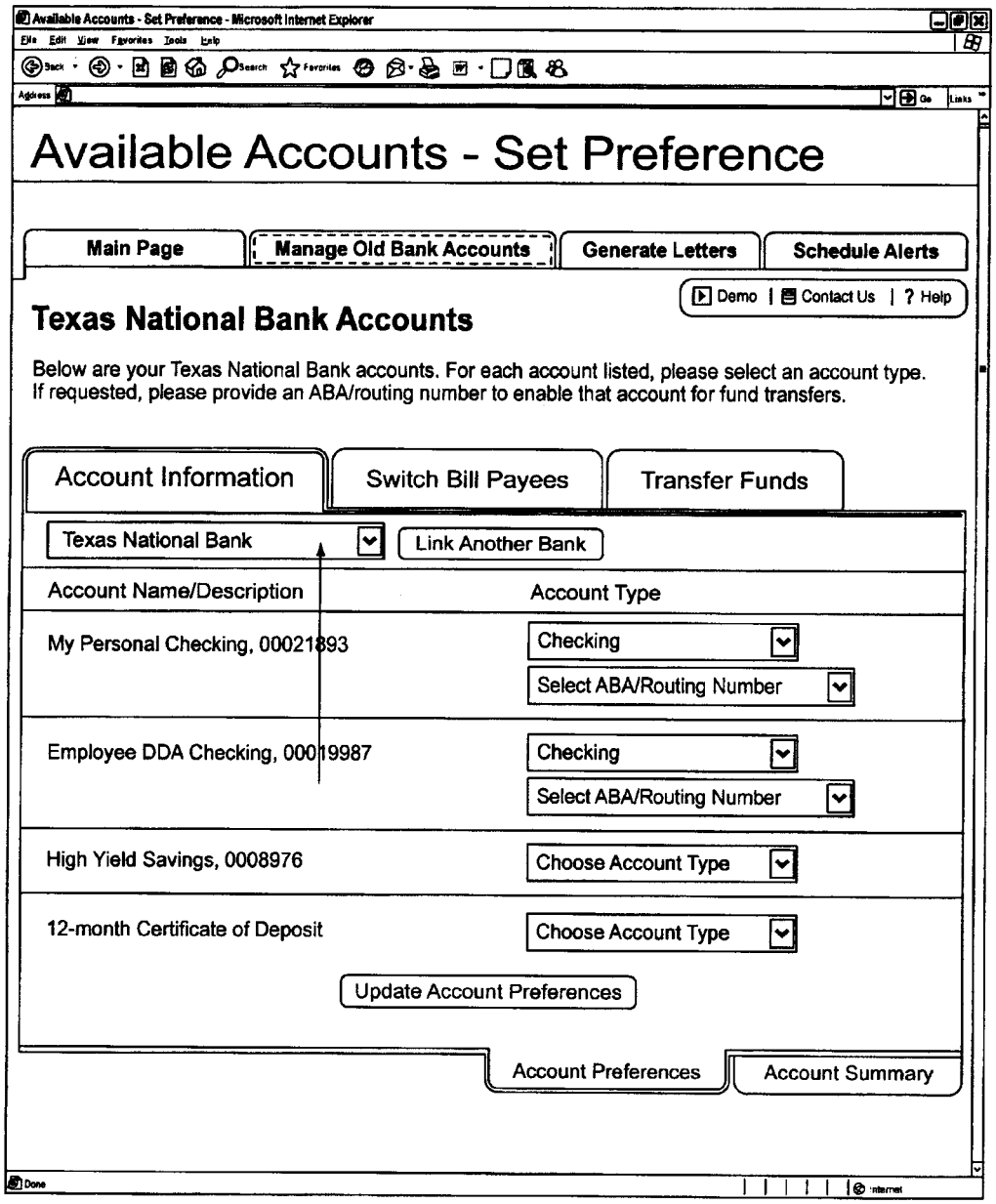

Another example screen is provided as FIG. 3D. This screen enables the user to view all of the user's accounts which are associated with, or maintained by, the particular account provider selected. In this example, there is illustrated a personal checking account, an employee checking account, a high yield savings account, and a certificate of deposit account, As previously discussed, any type of financial account (or other non-financial accounts) are envisioned as falling within the scope and spirit of the various described embodiments. FIG. 3D also illustrates additional options being presented to the user. These options include viewing account information, switching payees (which can include any account information transfer activity), and transferring funds. Account information can include any information associated with the accounts. This may include, for example, account names and descriptions, account types, balances, etc.

If the "switch bill payee" option is selected, then another screen may be presented to the user as shown in FIG. 3E. This screen provides the user with a view of all payees associated with the selected account provider. Alternatively, the listing may be all payees associated with a particular selected account (which may be one or more accounts maintained by the same account provider or different account providers). In this example, the bill payees are various service providers including a cable company, an Internet movie company, an insurance company, a lighting merchandiser and a mortgage bank. Any electronic payee may be included. Also in this example, the payees are all associated with a particular account provider. The user presumably has been using the account provider to make electronic payments to the payees from one or more of the user's accounts at the particular account provider. The user may select, from among the various payees, which payees will have information transferred to a new account provider. The user may select one or more payees and initiate the transfer of information associated with the payees. The screen in this example displays some of the payee information including name and the user's account number for each payee. Other payee information may be displayed and/or transferred. The payee information being transferred may include any information associated with the payee(s). For example, the information may include name, address, billing address, account number, balance amount, billing cycle information, contact name and address, security codes, login names and passwords, etc. The payee information may also include payment instructions such as payment amounts and frequency, payment dates, etc. In this example, payee information will be transferred from the old account to a new account maintained by the account provider which is also providing the account information transfer application and GUI. However, other scenarios are envisioned, including transferring information to third party providers, or between accounts for the same account provider.

Figure 3F:
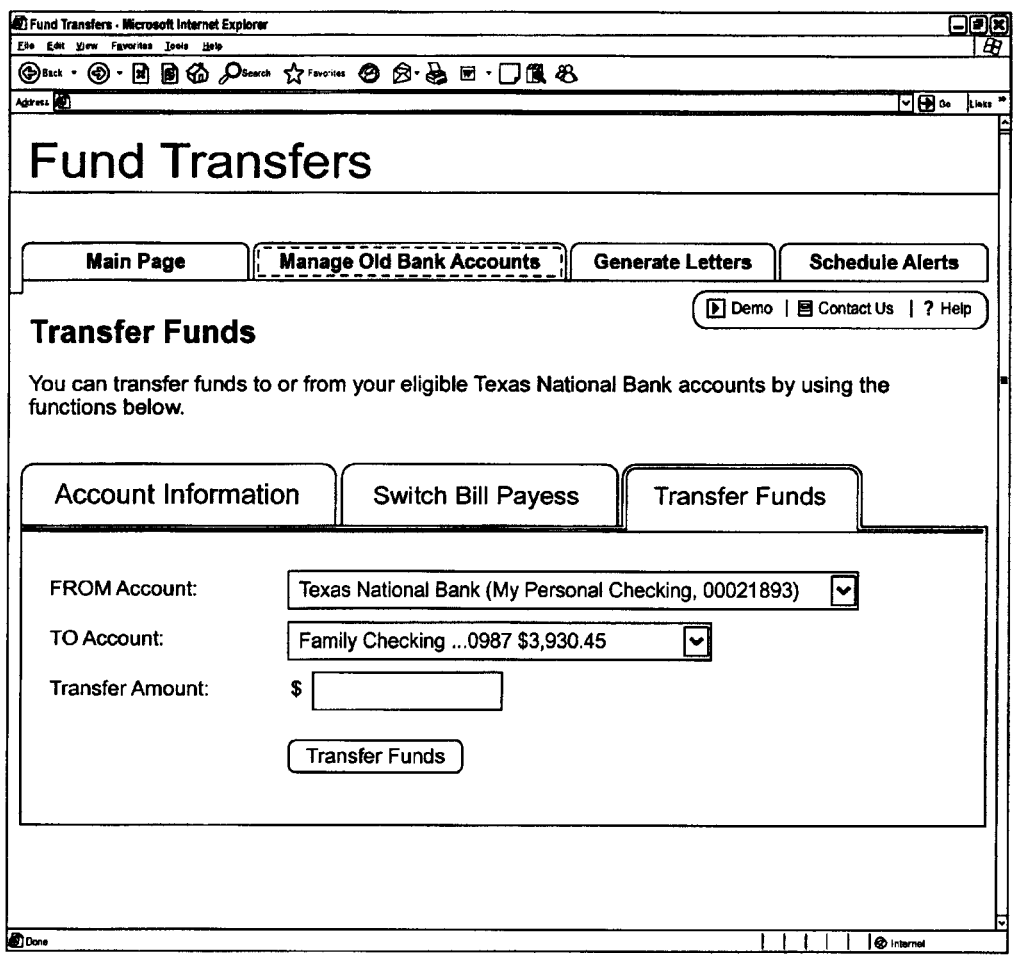

FIG. 3F illustrates a screen at which a user may transfer funds. Funds may be transferred from one account to another account at the same account provider or at a different account provider. The funds transfer activity may be associated with the payee information transfer activity. For example, funds may be transferred from the first electronic payment account to the new electronic payment account contemporaneously with the population of the new electronic payment account with the transferred electronic payee information.

Figure 3G:
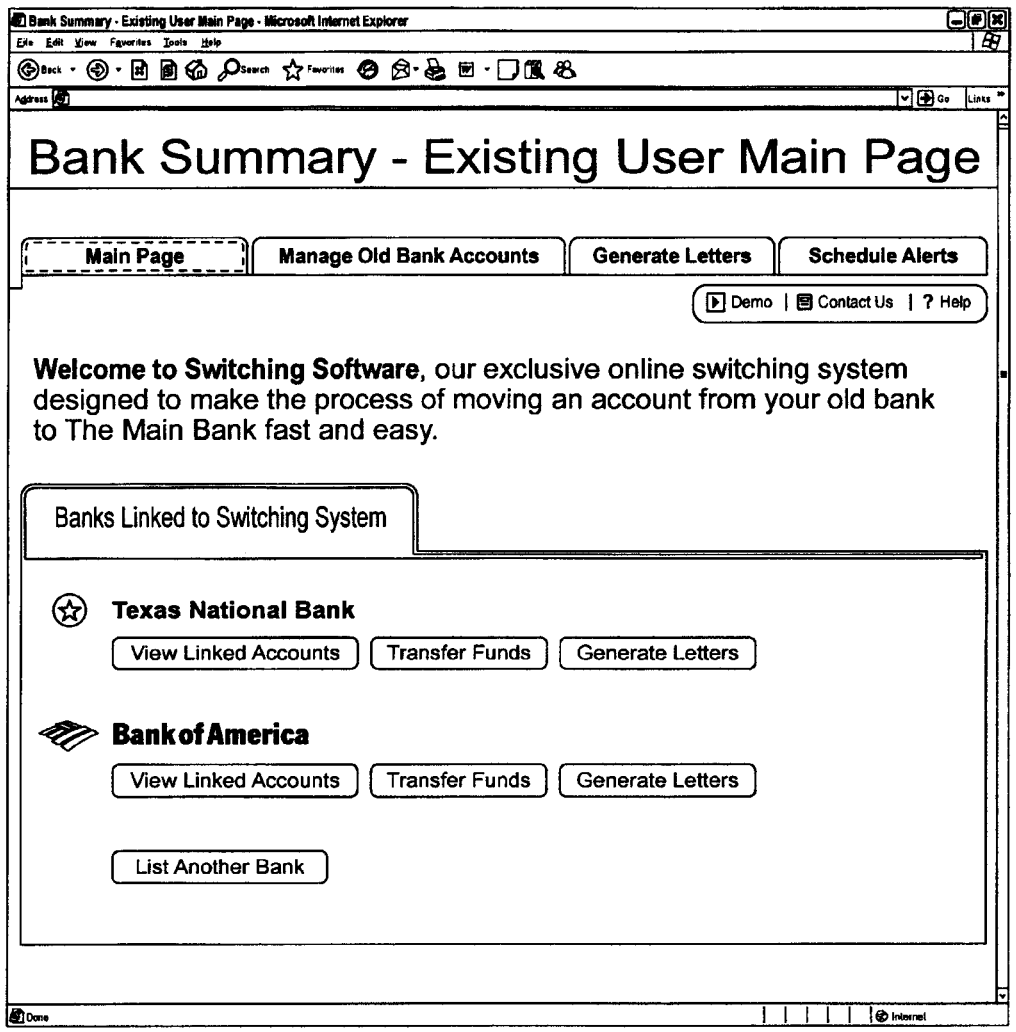

Another example screen is illustrated in FIG. 3G, which shows an existing user main page that provides a summary of linked banks. If an account information switch was previously initiated, on subsequent visits to this main page the user is presented with the linked banks and associated account and payees. If the linking process was discontinued before screen scraping of account data or before setting account preferences, some services may be displayed as unavailable (for example, they may be "grayed out").

Figure 3H:
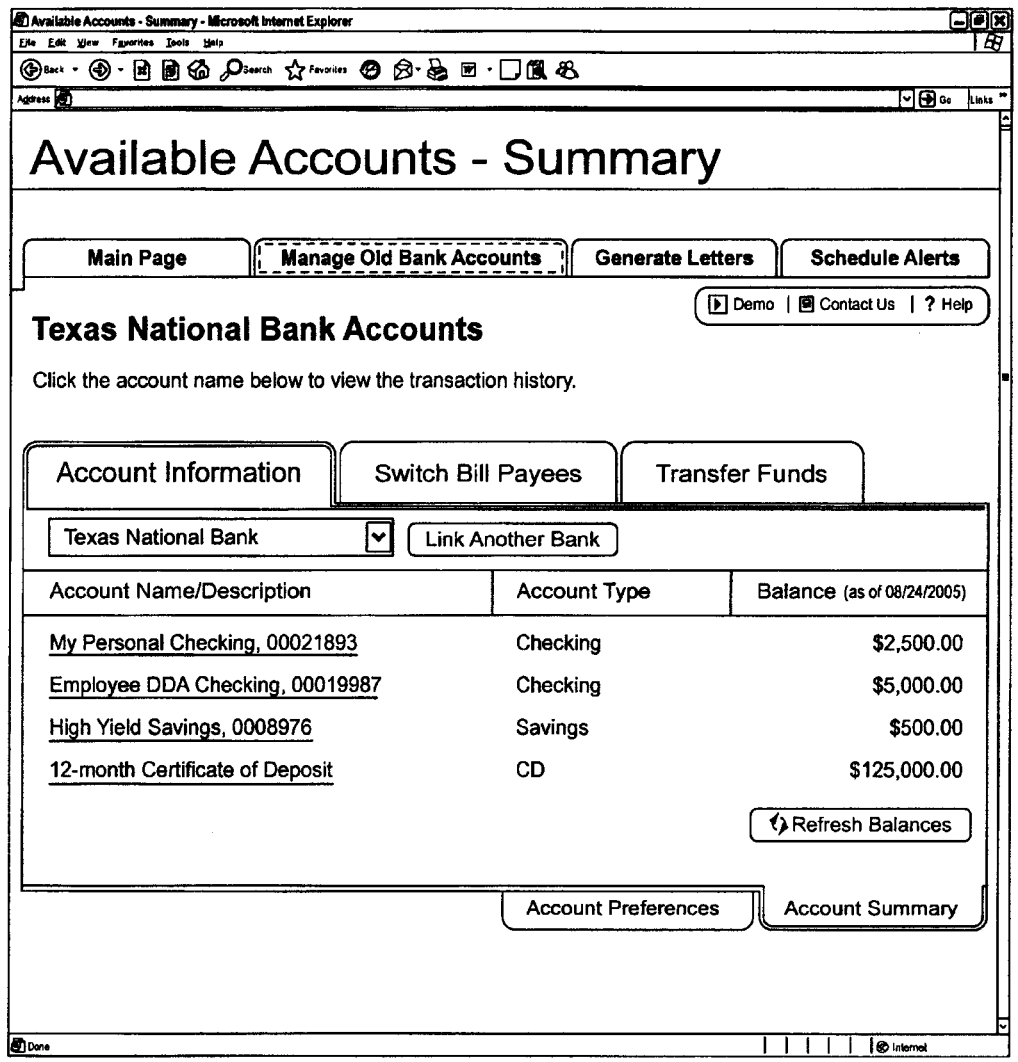
Figure 31:
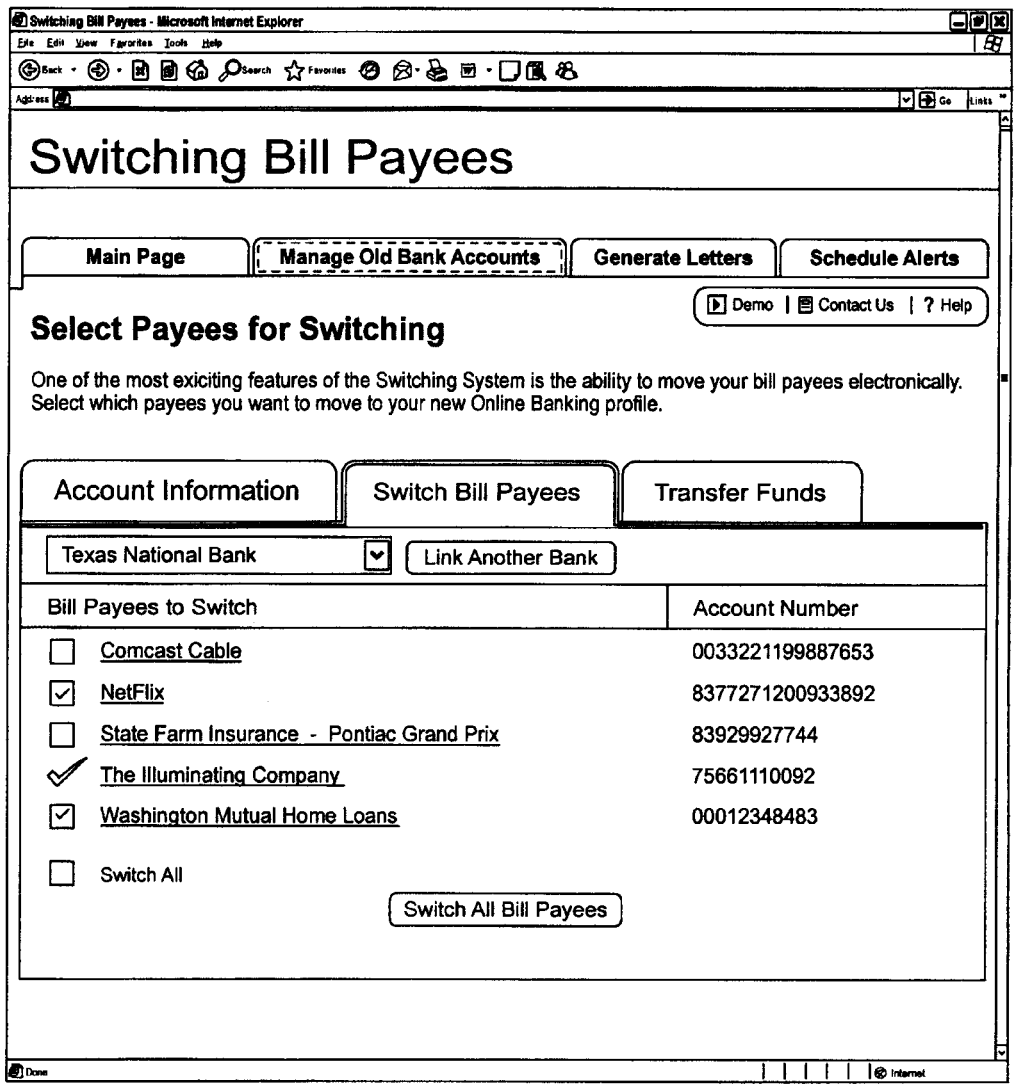

FIG. 3H illustrates an example available accounts summary screen. If the account preferences button has been clicked or the account summary tab has been selected, then the accounts for a specific bank are displayed. Such a screen may include account name links that display the collected transaction history and that provide action buttons to transfer funds and to switch bill payees. Furthermore, balances provided on this screen may be updated in a daily (or other periodic) routine and/or may be updated by the user's selection of a refresh balances button.

An example screen in which bill payees may be switched is illustrated in FIG. 3I. During the login process, bill payees are collected for the associated account owner. The accounts may then be displayed on a screen such as the one illustrated and be made available for switching. Switching an account then adds the bill payee's information to the new bank's online banking profile.

Figure 3J:
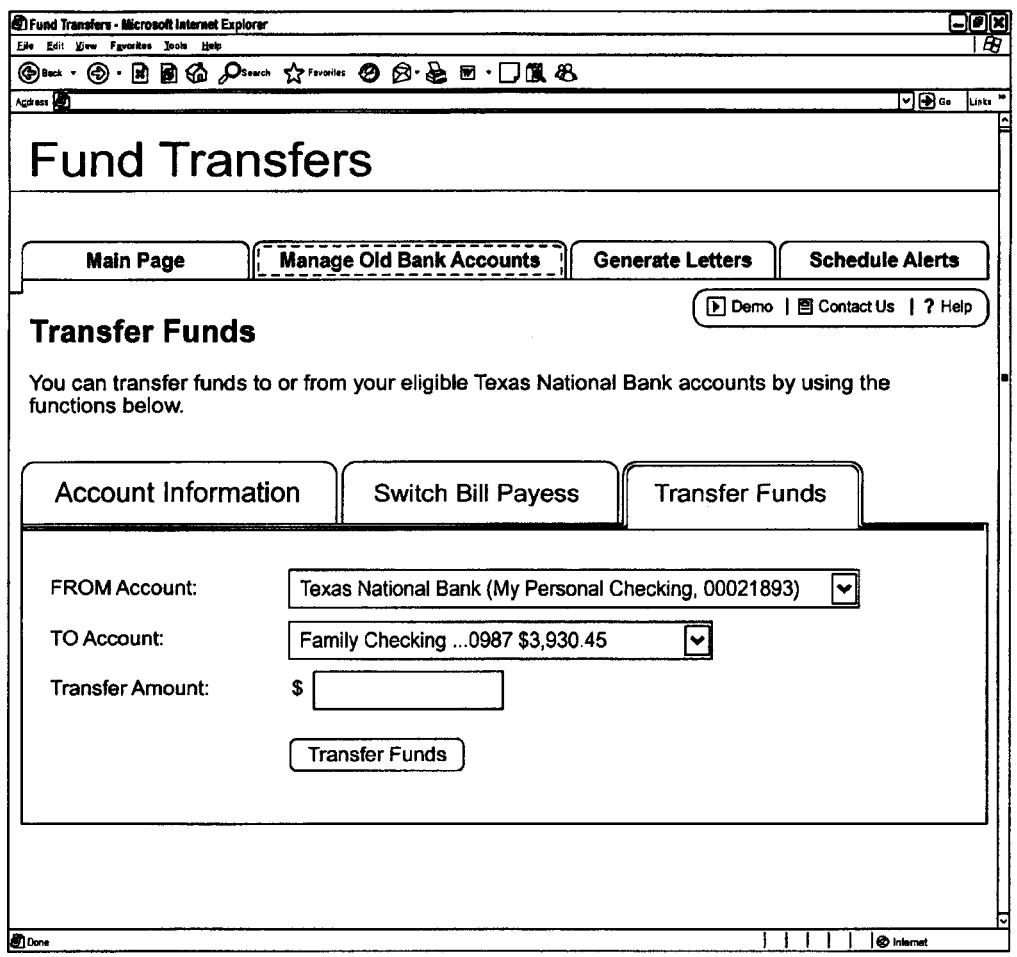

FIG. 3J illustrates an example fund transfer screen. In this screen, all external accounts that available for transfers (for example, those accounts identified as checking accounts) are displayed in the "FROM Account" dropdown list. All eligible transferee accounts are displayed in the "TO Account" dropdown list. A user may thus easily transfer amounts between listed accounts.

Figure 3L:
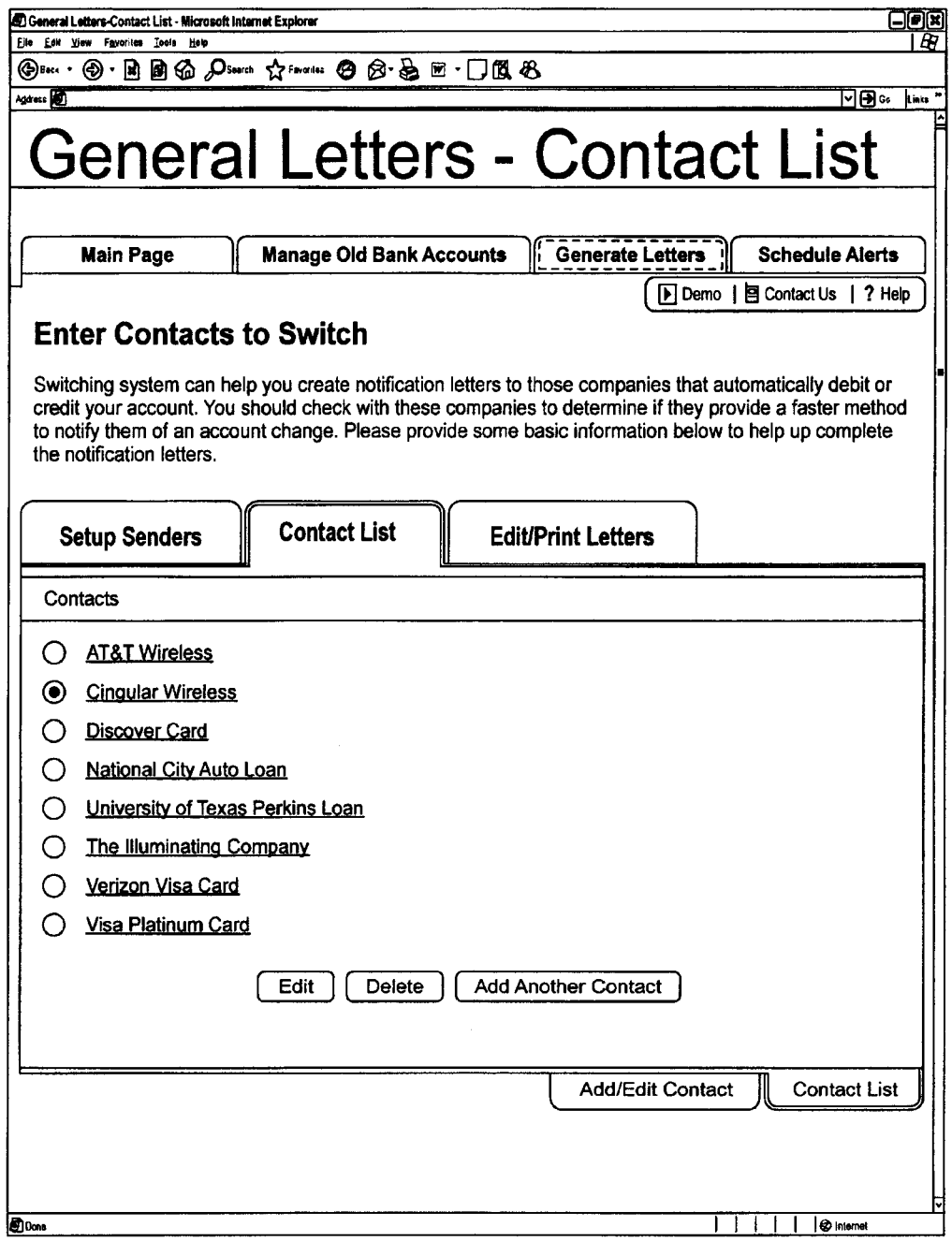

FIG. 3K illustrates a contact set-up screen for a letter generation feature. Using this feature, notification letters can be generated to companies that automatically debit or credit an account. The example screen enables a user to input information regarding an automatic debiter that may or may not be set up as a bill payee, but that will need to be informed of the account change. This information can later be used to automatically generate letters to facilitate the switching of accounts. An example contact list screen for the letter generation feature is illustrated in FIG. 3L. This screen allows a user to manage all entered contacts. The user may select a contact to edit the contact information or to delete the contact. FIG. 3M illustrates an example screen at which a user may manage and print letters to switch accounts. All entered contact and the associated sender may be shown here. The user may select one or more contacts, enter the number of copies of the letter to print, and then print the letters. Furthermore, this screen may provide a close account button that displays a letter addressed to an appropriate bank authorizing the closure of associated accounts.

FIG. 3N illustrates an example schedule alert screen. On this screen alerts can be set up to inform the user when a likely switched transaction has occurred.

According to another feature of the system, a notification routine may be provided and may be made accessible, for example, through the electronic payment information transfer application and/or the GUI. Preferably, the notification routine accepts as input from a user such information as account provider, routing number, primary and secondary account owner names and addresses, and account numbers. The notification routine may also be configured to accept information for offline banks. The routine may be further configured to accept other account contacts including payees, banks, or auto debiters that are not payees but still need to be informed of the account transfer activity. Preferably, after all of the contact information is input by the user, the system displays (via the GUI) a listing of all contacts for which notifications will be sent. The user can then select one or more of the contacts and initiate the automated generation of notices. Multiple notices may be generated. The notices may be sent electronically or by mail. The notice may be in any suitable form or medium. For example, the notice may be an automatically generated letter with fields for the payee or account provider contact name and other information, and for the user name, account number and other information. The letter may inform the recipient (e.g., a payee) of the switch of the electronic payment information for that payee from the first (old) account to a second (new) account.

According to another feature, the system may be configured to display to the user various options for specifying alerts and alert parameters. An alert may be specified, for example, for a situation in which a selected transfer of electronic payment information occurs. Alert parameters may include account identifiers, alert medium or method preferences, limits, dates, ranges, minimum and/or maximum amounts, etc. As another example, an alert may be generated if an account balance dips below a certain specified minimum threshold. Alerts may be sent to the user specifying the alert parameters or to any other party specified by the user or linked to the system.

According to still other features, the system preferably accomplishes several objectives. For example, the transfer application preferably automatically recognizes all providers and accounts linked to the system. These can be the accounts maintained by the provider of the system or third-party providers and their accounts. Bill payment information (including, but not limited to bill payee information) is also automatically recognized by the system. The system may track transfer histories. The transfer application may move payment information from selected accounts to new accounts provided by the system provider or to designated accounts at third parties. As discussed, the system preferably accepts authentication information from a user (such as login and password information) and automatically sends such information to a linked account provider in order to enable the user to access accounts at a selected linked provider. The system may be configured to accept payment instructions for a new electronic payment account, or transfer payment instructions for various payees from an old account to a new account. The payment instructions may include information such as payment amount, reference number, invoice number, account number, payee information, frequency, payment date, account from which payments are made, payee name, etc. Preferably, if recurring payment information is transferred, time system is configured to discontinue authorization for the prior account provider to make payments from the old account to the same payee. Optionally, a notification may be sent the user instructing them to discontinue the automatic payments from the old account. This will avoid the occurrence of duplicate payments to payees. Payee information may be transferred directly into the new bank's online banking system for automatically paying from their online banking system.

Further features includes providing a pre-set list of payees for which the user can obtain electronic information relating to an account switch. For example, a user can extract balances, transaction history, account details, payee menus, and other suitable information. This list can be updated periodically. Users that have payees that are on this list can use all the functions and features of the service provided that they have security credentials to access the site on-line (for example, a user ID and password). For other companies, the user can still access the service and use the provided letter generation and alert capabilities.

Figure 2:
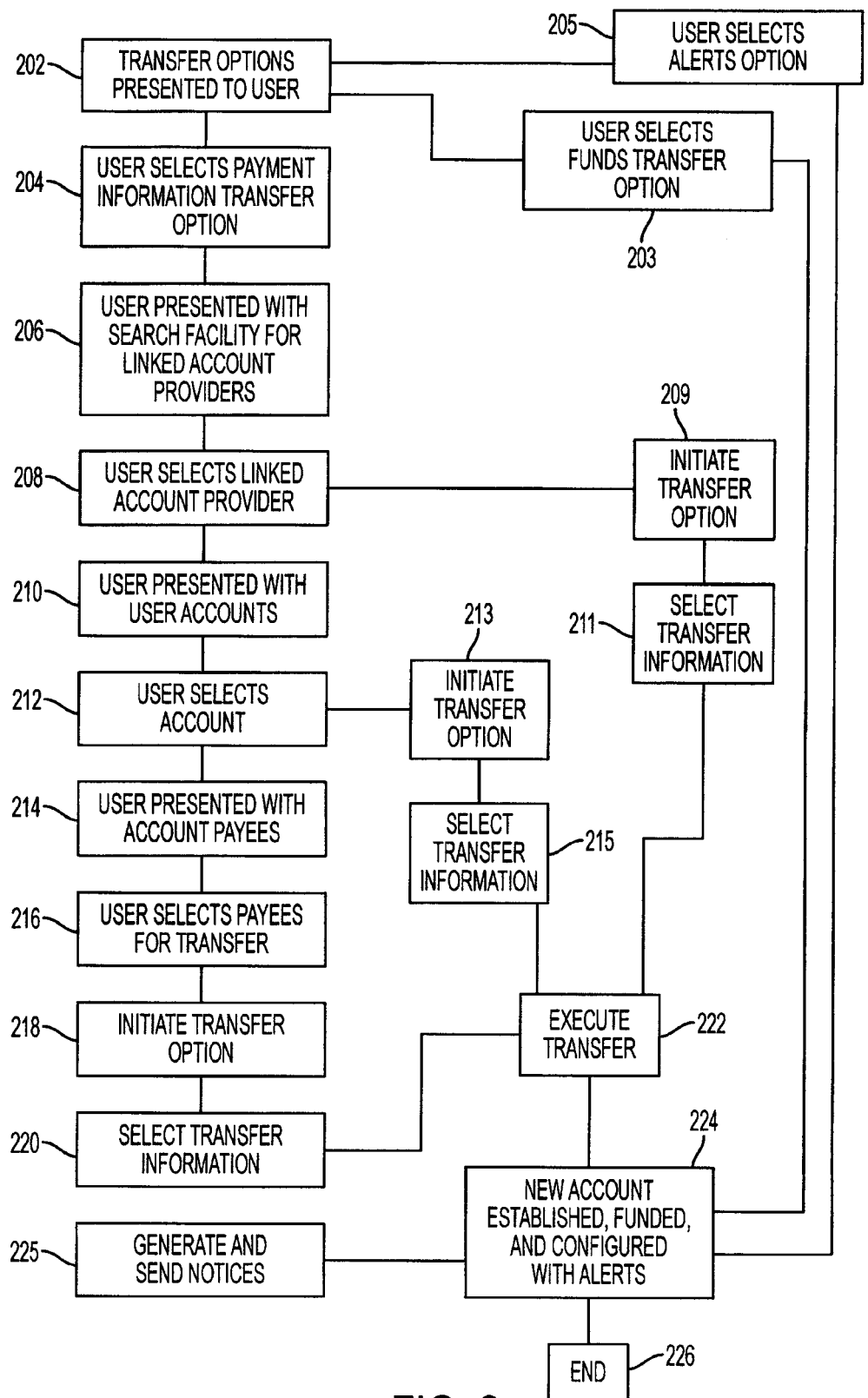
FIG. 2 illustrates an example method of transferring information from a first electronic payment account to a second electronic payment account in accordance with an embodiment of the invention.

FIG. 2 illustrates an example method of effecting the transfer of information within a first electronic payment system of a first account provider to a second electronic payment system of a second account provider. At step 202, electronic account transfer options are presented to a user. The options may include, without limitation, transferring electronic payment information, transferring funds, and establishing alerts. At step 204, a user selects an electronic payment information transfer option. At step 206, the user is presented with linked account providers. Alternatively, the user may be presented with a search facility in order to search for linked account providers at which the user has an account. The linked account providers may have an electronic communications link with the system provider and with the user, A linked account provider may be linked to a computer hosting a transfer application. The link may be established, for example, through a web site and/or a graphical user interface (GUI). The GUI may also be used to provide the various steps and options to the user. Linked account providers may be any account providers including, without limitation, banks, credit issuers, merchandisers, service providers, and online or electronic bill payment providers. At step 208, the user selects one or more of the linked account providers. At step 209, the user has the option to initiate a transfer of electronic payment information from the one or more selected account providers. The transfer may be to a new account, a different account, a new account provider, the same account provider, a third party, or the system provider. At step 211, the user may select what information will be transferred. Information may be any information associated with electronic payments including, without limitation, account names and numbers, codes, identifiers, amounts, payment dates and frequencies, ranges, names, addresses, phone numbers, contact information, email addresses, web addresses, http links, electronic communication protocol information, preferences, authentication and verification information, login names, user names, passwords, etc. The information may be transferred to a new electronic payment account. At step 210, for each selected account provider, the user is presented with the user's accounts that are associated with or maintained, by the selected account provider(s). At step 212, the user selects one or more of the presented accounts. At step 213, the user is presented with the option of transferring electronic payment information similar to step 209 above. At step 215, the user selects the information to be transferred similar to step 211 above. At step 214, the user is presented with one or more electronic payees associated with each of the selected accounts. At step 216, the user selects one or more of the payees. At step 218, the user initiates a transfer of electronic payment information. At step 220, the user selects to information to be transferred. At step 222, an electronic payment information transfer is effected. Preferably, this is accomplished at the direction of the user. The user may, in certain embodiments, initiate the transfer through the GUI. At step 224, the transfer is affected and the new electronic payment account is populated with the information from the one or more old accounts. The new account may, in certain circumstances, actually include multiple accounts. The new account may also, in certain circumstances, include an already-existing account to which information from the selected (old) account is being transferred. The new account(s) may be accounts provided by the system provider, the selected (old) account provider, a new account provider, or a third party. At step 203, the user may select a funds transfer option and effect the transfer of funds from one account to another account (including a new electronic payment account which has been established and/or populated by the user or system provider via the GUI). At step 205, the user may select an alerts generation option to establish alerts associated with the new electronic payment account and/or any already-existing account, or with any transfer activity being provided by the system. At step 224, in addition to populating the new account, funds are transferred to the new account and the new account is configured for the specified alerts. At step 226, the method ends.

Certain additional steps (not expressly shown) may also be included. For example, the entity establishing the second electronic payment account may execute an account confirmation step to confirm the accuracy of payment information in the second account. This may be accomplished by a manual or electronic comparison of the data fields in the first electronic payment application and the second electronic payment application. The confirmation step may also involve sending an electronic or hard copy version of the second electronic payment account parameters to the customer to obtain approval of the transfer.

An additional step may involve generating notifications as described above. An additional step may be establishing authorization for automatic electronic payments to payees through the new electronic payment account and/or the discontinuation of automatic payments to payees from the old account(s).

At suitable times, such as where the user needs to access an account, an electronic communication path may be established from the user and/or the new account provider (or system provider) to an account provider maintaining the existing account. Authentication and verification information may be input by the user and sent to selected account providers in order to enable the user to access selected accounts and account information.

An additional step may include monitoring un-cleared payments (e.g., payments made by check, or electronic payments set up for an execution date later than the date the electronic payment was initiated). This monitoring function may be used to ensure that a payment was in fact made to the respective bill issuer (e.g., merchant). If a payment was not made, the entity managing the second account may prompt the customer to make a payment to the bill issuer. If the payment was made, the entity managing the second account may use this information to ensure that duplicate payments are not made. One objective of this scenario is to ensure uninterrupted and non-redundant payment of invoices during the transition.

Another additional step may include sending notifications of the transfer. Notifications may be sent, for example, to the customer, to the entity managing the first electronic payment account, and/or to merchants receiving payments via the first electronic payment account.

Another step may include altering existing automatic deposit information of the customer such that automatic deposits are made to a new financial account associated with the second (new) electronic payment account.

It should also be understood that certain steps may be eliminated. For example, it might not be necessary to allow the user to transfer account information at three different points in the process. Under certain circumstances, the user might only be prompted to initiate an information transfer after payees have been selected.

Modifications, additions, or omissions may be made to the method without departing from the scope of the invention. Additionally, steps may be performed in any suitable order without departing from the scope of the invention.

Although an embodiment of the invention and its advantages are described in detail, a person skilled in the art could make various alterations, additions, and omissions without departing from the spirit and scope of the present invention as defined by the appended claims.

The invention claimed is:

1. A system for transferring electronic account information, comprising:
a selection unit that enables a user to select a first account provider from a plurality of approved account providers;
a selection unit that enables a user to select one or more selectable electronic accounts associated with the first account provider;
a transmission unit comprising one or more computer processors configured to transmit the selection to a system that accesses a selected first account and effects a transfer of data associated with the first account to a second account provider, wherein accessing the first account by the system comprises obtaining data associated with the first account by using data extraction techniques and the transfer of data associated with the first account is used to establish a new account with the second account provider;
an application unit which enables the user to select to transfer funds from the first account at the first account provider to the new account at the second account provider, wherein the first and second accounts are associated with different account providers; and
a history unit which provides display of the transaction history of the first account from within the second account.

2. The system of claim 1, wherein at least one of the first and second account providers is selected from the group consisting of a financial institution, a merchant, a utilities provider and an electronic bill payment system provider.

3. The system of claim 1, wherein a processor is controlled by the second account provider.

4. The system of claim 1, wherein the user is a customer owning the first electronic account.

5. The system of claim 1, wherein the user is an employee of the second account provider.

6. The system of claim 1, wherein the data comprises electronic payee account information of a payee associated with a first account.

7. The system of claim 1, wherein the data comprises payment instructions specified by the user.

8. The system of claim 1, wherein the selection unit enables a user to select one or more electronic payees associated with one or more of the selectable electronic accounts.

9. The system of claim 8 wherein the transmission unit transmits information to a system that effects a transfer of data associated with the one or more electronic payees that were selected to the second account provider.

10. The system of claim 1, wherein the selection unit enables the user to select to change an association of one or more electronic payees from a the first account to the second account.

11. The system of claim 1, wherein the first and second accounts are at different account providers.

12. The system of claim 1, wherein the transmission unit transmits information comprising a payment amount and an authorization to deduct the payment amount from a customer's account.

13. The system of claim 1, wherein the selection unit enables a user to select to discontinue a customer authorization to the first account provider to make payments to payees from the first account.

14. The system of claim 1, wherein the selection unit enables a user to select to generate an automated notification regarding the transfer of account information.

15. The system of claim 14, wherein the notification comprises a notice to the first account provider.

16. The system of claim 14, wherein the notification comprises a notice to at least one payee associated with the first account.

17. The system of claim 1, wherein data is transferred to a new account, and wherein the selection unit enables a user to select one or more alert parameters for generating an alert regarding activity associated with the new account.

18. A method of transferring electronic account information, executable on a processor of a programmed computer system comprising computer readable storage configured to store processor-executable instructions or other computer-readable data, comprising:
through a second account provider system, presenting an interface to a user, the interface comprising:
a display of a plurality of approved account providers presented to allow the selection of a first account provider from that plurality, and
one or more selectable accounts associated with the first account provider, wherein the interface operates according to computer-executable instructions executed by a processor on a programmed computer system;

receiving a user selection, made through the interface, of one or more first account of the selectable accounts;

providing access to the first account and providing information associated with the first account by using data extraction techniques;

transferring information associated with the first account to a new account at the second account provider, wherein the transfer of information associated with the first account is used to establish the new account with the second account provider and wherein the first and second accounts are associated with different account providers; and displaying the transaction history of the first account together with the new account.

19. The method of claim 18, wherein the information comprises electronic payee account information of a payee associated with the first account.

20. The method of claim 18, wherein the information comprises payment instructions specified by the user.

21. The method of claim 18, further comprising presenting the user with one or more electronic payees associated with the first account, and enabling the user to select one more of the electronic payees and effect a transfer of data associated with the one or more selected electronic payees from the first account provider to the second account provider.

22. The method of claim 18, further comprising presenting the user with one or more electronic payees associated with the first account, and enabling the user, through the interface, to change the association of one or more selected payees from the first account to a second account.

23. The method of claim 22, wherein the first and second accounts are associated with a single account provider.

24. The method of claim 18, further comprising enabling the user, through the interface, to transfer funds from the first account at the first account provider to the new account at the second account provider.

25. The method of claim 18, further comprising enabling the user, through the interface, to authorize the second account provider to deduct payments to one or more electronic payees from the new account.

26. The method of claim 18, further comprising enabling the user to discontinue an authorization to the first account provider to make payments to electronic payees from the first account.

27. The method of claim 18, further comprising automatically generating one or more notifications regarding the transfer of account information.

28. The method of claim 27, wherein time notification is sent to at least one electronic payee associated with the first account.

29. The method of claim 18, further comprising enabling the user to specify one or more alert parameters for generating an alert regarding activity associated with the new account.

30. The method of claim 18, further comprising enabling the user to view and refresh account information from the first account provider.

31. The method of claim 30, wherein the account information comprises the account balance.

32. The method of claim 30, wherein the account information comprises a transaction history.

33. The method of claim 18, further comprising:

enabling a plurality of account information transfer activities; and enabling at least one of a plurality of users to engage in all of the account information transfer activities and enabling at least another one of the plurality of users to only engage in a subset of the account information transfer activities.

34. A system for transferring electronic account information, comprising:

a transmission unit that transmits data to a user system that enables a user of the user system to select a first account provider from a plurality of approved account providers and select one or more selectable accounts associated with the first account provider;

a receiving unit that receives one or more first account selections from the user system;

a transfer processing unit comprising one or more computer processors configured to:

access one or more of the one or more first account selections and obtains information associated with one or more of the one or more first account selections by using data extraction techniques, and effect transfer of information associated with one or more of the one or more first account selections to a second account associated with a second account provider, wherein the second account is a new account and the transfer of information associated with one or more of the one or more first account selections is used to establish the second account with the second account provider and wherein the first and second accounts are associated with different account providers;

an application unit which enables the user to select to transfer funds from the one or more first account selections at the first account provider to the second account at the second account provider; and a history unit which provides display of the transaction history of the one or more first account selections from within the second account.

* * * * *

UNITED STATES PATENT AND TRADEMARK OFFICE
CERTIFICATE OF CORRECTION

| | | |
|---|---|---|
| PATENT NO. | : 8,458,064 B1 | Page 1 of 1 |
| APPLICATION NO. | : 11/625972 | |
| DATED | : June 4, 2013 | |
| INVENTOR(S) | : Dobbins | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 880 days.

Signed and Sealed this
Ninth Day of December, 2014

Michelle K. Lee
*Deputy Director of the United States Patent and Trademark Office*